Dec. 14, 1937.　　　A. G. HERRESHOFF　　　2,102,415
PROPELLER SHAFT BEARING
Filed Jan. 25, 1934
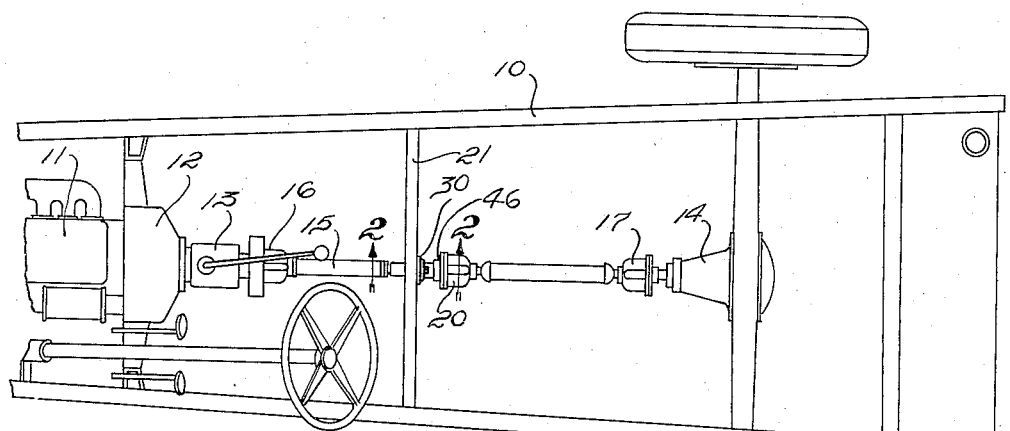
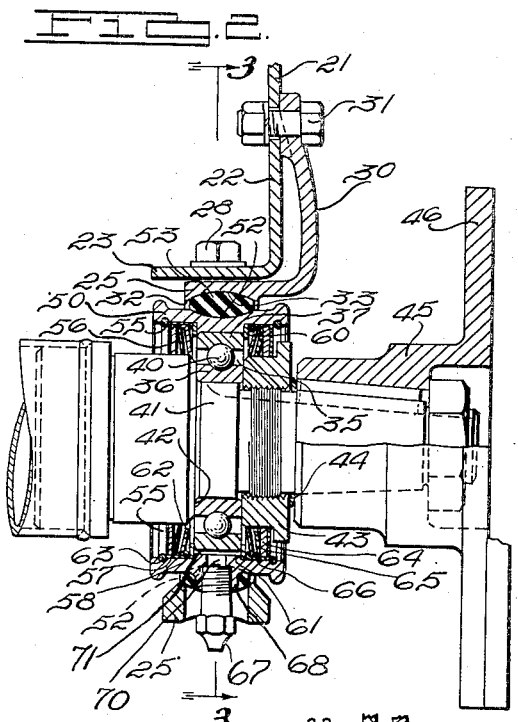
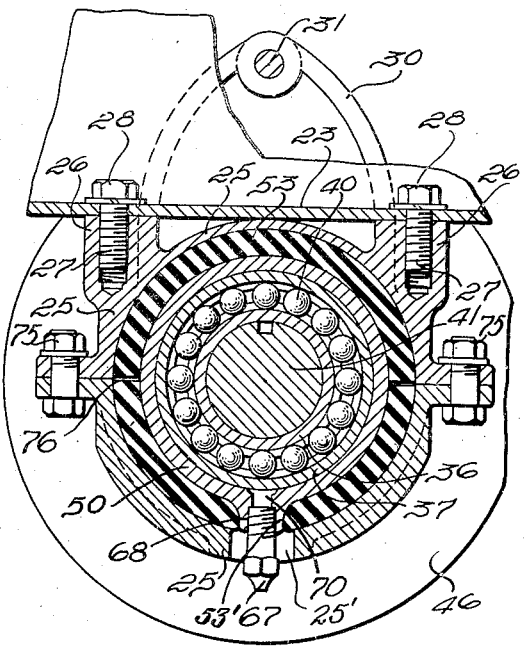
INVENTOR.
ALEXANDER G. HERRESHOFF.
BY
Harness, Lind Patee & Harris
ATTORNEYS.

Patented Dec. 14, 1937

2,102,415

UNITED STATES PATENT OFFICE 2,102,415

PROPELLER SHAFT BEARING

Alexander G. Herreshoff, Grosse Pointe, Mich., assignor to Chrysler Corporation, Detroit, Mich., a corporation of Delaware Application January 25, 1934, Serial No. 708,223

3 Claims. (Cl. 308—26)

This invention relates to bearings and more especially to propeller shaft center bearings and mounting means therefor.

The main objects of the invention are to provide an improved bearing and bearing mounting construction for yieldably supporting a propeller shaft at a midpoint of its length on the frame of an automotive vehicle; to provide means of this character for taking up angular misalignment of the propeller shaft; to provide means for taking up variations in the length of the propeller shaft; to provide means of this kind which permits the oil seal for the bearing to be assembled close to the bearing so as to avoid the effect of eccentricity of the propeller shaft; and to prevent the transmission of noise and vibrations from the propeller shaft and such bearing to resonant bodies such as the frame and body of the vehicle.

Other objects and advantages will become apparent from the following description and appended claims.

For the purpose of illustrating the genus of the invention, a typical concrete embodiment is shown in the accompanying drawing, in which:

Figure 1 is a top plan of a portion of the chassis of an automotive vehicle embodying a propeller shaft center bearing and mounting therefor according to the principles of this invention;

Fig. 2 is an enlarged section taken on the line 2—2 of Fig. 1; and

Fig. 3 is a section taken on the line 3—3 of Fig. 2.

Fig. 4 is a fragmentary sectional view similar to Fig. 2 showing a modified form of my invention.

In the construction shown, the numeral 10 designates the frame of an automotive vehicle, 11 a motor, 12 a clutch mechanism and 13 a change speed transmission mechanism, all carried by said frame. The transmission mechanism 13 is connected to a differential mechanism 14 by means of a propeller shaft 15. The propeller shaft 15 is provided with a plurality of universal joints such as the universal joint 16 arranged at the front end of the propeller shaft and adjacent the transmission mechanism 13, a universal joint 17 arranged at the rear end of the propeller shaft and adjacent the differential mechanism 14, and a universal joint 20 arranged at a point intermediate the ends of the propeler shaft 15. Where a plurality of universal joints are provided in a propeller shaft it is desirable to support the propeller shaft at a point intermediate its ends. To this end a cross member 21 is provided on the frame 10 and in the present instance consists of a channel member opening toward the front end of the vehicle and comprises a vertically disposed web 22 and a lower horizontal flange 23. The cross member 21 is employed for supporting a bearing arranged at an intermediate point with respect to the length of the propeller shaft 15.

Referring more especially to Figs. 2 and 3, a rigid support member 25 is provided with boss members 26 which are in turn provided with threaded openings 27 so that the support member 25 may be fixed to the flange 23 of cross member 21 by means of bolts 28 or other suitable fastening element. The support member 25 may also be provided with a loop bracket 30 by which it may be fixed to the web 22 of cross member 21 by means of a bolt 31. The support member 25 is also provided with a longitudinally extending opening 32 of such form as to provide a spherical seating surface 33 on the inner peripheral wall of the support member 25.

A radial bearing 35, in the present instance, consists of an inner race 36 and an outer race 37 nonyieldably spaced in a radial direction by antifriction elements 40, illustrated as spherical in form, although rollers may be employed if desired. The inner race 36 makes a close press fit upon a cylindrical portion 41 of the propeller shaft 15 and is locked in this position between a shoulder 42 on the propeller shaft and a nut 43 threaded to the propeller shaft. The nut 43 may be locked in position by means of a lock washer 44 interposed between the nut 43 and a hub 45 keyed to the propeller shaft and integral with a securing disc 46 of the universal joint 20. An annular bearing holder 50 encloses the outer race 37 of bearing 35 and makes a close press fit thereon. The bearing holder 50 is provided with an annularly directed recess 52 of substantially the same curvature as the recess 33 provided in the support member 25. An annular resilient member 53 having convex outer and inner peripheral surfaces is disposed in the recesses 33 and 52, respectively, provided in the support member 25 and in the holder 50. The resilient annulus 53 yieldably mounts the bearing 35 and its holder 50 within the rigid support 25 and serves to take up all angular misalignment of the propeller shaft 15, to take up production variations due to different lengths of the propeller shaft; and to damp out vibrations and noise and to prevent transmission of the frame to a resonant body such as the frame 10.

The holder 50 extends forwardly and rearwardly with respect to the bearing 35 and with respect to the annulus 53 so that it may also serve as a support for oil seals arranged on both sides of the bearing 35. These oil seals may be of any desired type, and as illustrated include an annular casing member 55 comprising a disc portion 56 and a peripheral flange 57 provided with a beaded margin 58 adapted to contact a disc 60 abutting the side of the outer race 37 of bearing 35 and a shoulder 61 formed on the bearing holder 50 to maintain the bearing and holder in the desired alignment. The casing members 55 are maintained in abutting position against the disc 60 by means of a snap ring 62 disposed in a suitable groove 63 in the holder 50. The sealing element may include a fiber washer 64 and a metallic sealing element 65 maintained in contact with the shaft 15 and nut 43 by a spacer element 66 and the resiliency of the metallic sealing element 65.

By mounting the oil seals on the holder 50, the resilient annulus 53 takes the angular misalignment or eccentricity of the shaft 15 so that contact of the fiber sealing element 64 or metallic sealing element 65 is not disturbed or destroyed by movement other than rotation of the shaft 15.

Lubricant may be supplied to the bearing 35 by means of a fitting 67 extending through an opening 25' in the support 25 and threaded through the boss 68 provided on the holder 50 and projecting to the resilient annulus 53, the latter having an opening 53' accommodating the boss 68. The fitting 67 communicates with an opening 70 provided in the holder 50 and extending to a longitudinally directed recess 71 provided in the holder 50 adjacent the outer periphery of the outer bearing race 37 so that the lubricant may be forced between this bearing race and the holder 50 to the anti-friction elements 40 of the bearing 35.

As will be noted from Fig. 3, the rigid support member 25 may be centrally divided along a horizontal plane to provide upper and lower separable halves which may be detachably connected by means of bolts 75. The annulus 53 may also be divided as indicated at 76.

In the form shown in Fig. 4, the resilient annulus 53' has substantially cylindrical inner and outer peripheral portions which are received by correspondingly shaped outer and inner peripheries of the bearing holder 50' and rigid support 25', respectively. These substantially cylindrical portions have a common axis which substantially coincides with the axis of the bearings and bearing holder, and the latter as well as the resilient annulus, which may be a one piece structure, are adapted to be moved axially into their intended positions within the support 25'. The remaining portion of the structure of the form of my invention shown in Fig. 4 is substantially identical to that shown in Figs. 1 to 3 inclusive, and the parts thereof are correspondingly numbered.

As many changes could be made in the above construction and many apparently widely different embodiments of this invention could be effected without departing from the scope thereof, it is intended that all matter contained in the above description or shown in the accompanying drawing shall be interpreted as illustrative and not in a limiting sense.

What is claimed is:

1. A bearing for supporting in suspended relationship to a frame a propeller shaft having a plurality of universal joints, including a non-yieldable radial bearing rotatably journaling said shaft therein at a point intermediate two of said universal joints, a rigid support member fixed to said frame and provided with an opening therein, a rigid bearing holder enclosing said bearing and closely fitting the periphery thereof, a rubber annulus having cross sectional convex inner and outer peripheral surfaces, said holder and support member being provided with recesses complementary with the inner and outer peripheral surfaces, respectively, of said annulus for receiving the latter, said rubber annulus being disposed in said recesses and intermediate said holder and support member to take up variations in the length of said propeller shaft and yieldably to oppose angular misalignment of said propeller shaft.

2. A bearing for supporting in suspended relationship to a frame a propeller shaft having a plurality of universal joints, including a non-yieldable radial bearing rotatably journaling said shaft therein at a point intermediate two of said universal joints, a rigid support member fixed to said frame and provided with an opening therein, a rigid bearing holder member enclosing said bearing and closely fitting the periphery thereof, and a rubber annulus having a substantially convex peripheral surface, one of said members being provided with a recess complementary with the aforesaid peripheral surface of said annulus for receiving the latter, said annulus being disposed in said recess and intermediate said members to take up variations in the length of said shaft and yieldably to oppose angular misalignment thereof.

3. A bearing for supporting a rotatable shaft intermediate its ends in suspended relation from a frame including a non-yieldable bearing rotatably journaling said shaft therein at a point intermediate the ends of said shaft, a support member fixed to said frame and having an opening therein, a bearing holder encircling said bearing and having a radially extending projection, and a resilient annulus interposed between said support member and said bearing holder and having a radially extending aperture for accommodating the projection of said bearing holder, said projection and said holder having registering apertures communicating with said radial bearing for admitting lubricant thereto.

ALEXANDER G. HERRESHOFF.